(12) United States Patent
Ludin et al.

(10) Patent No.: US 10,745,098 B2
(45) Date of Patent: Aug. 18, 2020

(54) ENERGY-ABSORBING UNDER-FLOOR AIRFRAME

(71) Applicant: The Boeing Company, Chicago, IL (US)

(72) Inventors: Douglas R. Ludin, Malvern, PA (US); Matthew S. Stauffer, Bridgeport, PA (US); Akif Bolukbasi, Mesa, AZ (US); Eric Schulze, Hockessin, DE (US)

(73) Assignee: The Boeing Company, Chicago, IL (US)

(*) Notice: Subject to any disclaimer, the term of this patent is extended or adjusted under 35 U.S.C. 154(b) by 287 days.

(21) Appl. No.: 15/695,052

(22) Filed: Sep. 5, 2017

(65) Prior Publication Data

US 2019/0071163 A1 Mar. 7, 2019

(51) Int. Cl.
*E04C 3/02* (2006.01)
*B64C 1/18* (2006.01)
(Continued)

(52) U.S. Cl.
CPC .............. *B64C 1/062* (2013.01); *E04C 3/02* (2013.01); *B64C 1/061* (2013.01); *B64C 1/18* (2013.01);
(Continued)

(58) Field of Classification Search
CPC ...... E04C 3/04; E04C 3/02; E04C 2003/0408; E04C 2003/0413; E04C 2003/0452; B64C 1/061; B64C 3/04; B64C 1/18; E04B 1/38
See application file for complete search history.

(56) References Cited

U.S. PATENT DOCUMENTS 3,751,870 A * 8/1973 Vesei .................... E04B 5/14
                                                        52/656.1
4,129,974 A * 12/1978 Ojalvo .................. E04C 3/06
                                                        29/897.35
(Continued)

FOREIGN PATENT DOCUMENTS

EP         2532581 A1    12/2012
EP         2674355 A2    12/2013
(Continued)

OTHER PUBLICATIONS

European Extended Search Report dated Jan. 28, 2019 in European Patent Appl. No. 18192189.1.
(Continued)

*Primary Examiner* — Phi D A
(74) *Attorney, Agent, or Firm* — Ostrager Chong Flaherty & Broitman P.C.

(57) ABSTRACT

A composite structural member and an arrangement of such composite structural members are constructed to provide a multi-functional under-floor airframe that reacts flight, handling and internal cargo loads, and is capable of absorbing energy when subjected to vertically applied compression loads, such as loads that may be applied in hard landing or crash situations. The composite structural member and arrangement of such composite structural members adds no parasitic weight to the aircraft, i.e., there is no need for additional energy-absorbing systems, structures or mechanism; and is lighter weight as compared to metal. The composite structural member and related parts of the arrangement of such composite structural members are designed to progressively collapse throughout the stroke (or displacement) that occurs when a dynamic compressive load is applied to the structural member and to work together with crashworthy seats to mitigate injuries to occupants.

17 Claims, 11 Drawing Sheets

(51) Int. Cl.
*B64C 1/06* (2006.01)
*B64C 1/00* (2006.01)
*E04C 3/04* (2006.01)

(52) U.S. Cl.
CPC ........ *B64C 2001/0072* (2013.01); *E04C 3/04* (2013.01)

(56) References Cited

U.S. PATENT DOCUMENTS

| | | | | |
|---|---|---|---|---|
| 4,409,771 A * | 10/1983 | Lowe | ................. | E04C 3/07 52/840 |
| 4,452,657 A * | 6/1984 | Hamm | ................. | B29D 24/008 156/198 |
| 4,593,870 A * | 6/1986 | Cronkhite | ................. | B64C 1/062 188/375 |
| 4,988,232 A * | 1/1991 | Mason | ................. | E04B 1/5812 403/205 |
| 5,069,318 A | 12/1991 | Kulesha | | |
| 5,310,137 A * | 5/1994 | Yoerkie, Jr. | ................. | B64C 27/001 244/17.27 |
| 5,553,437 A * | 9/1996 | Navon | ................. | E04C 3/07 52/837 |
| 6,374,570 B1 * | 4/2002 | McKague, Jr. | ................. | B29C 65/56 52/762 |
| 6,430,890 B1 * | 8/2002 | Chiwhane | ................. | E04B 1/2403 52/655.1 |
| 6,520,706 B1 * | 2/2003 | McKague, Jr. | ................. | B29C 70/342 403/265 |
| 7,244,487 B2 * | 7/2007 | Brantley | ................. | B29C 65/561 244/123.7 |
| 7,607,273 B2 * | 10/2009 | Henderson | ................. | E04B 1/2403 403/313 |
| 7,740,202 B2 * | 6/2010 | Namaizawa | ................. | B64C 3/18 244/117 R |
| 7,845,594 B2 * | 12/2010 | Poggi | ................. | B64C 1/062 244/117 R |
| 7,861,970 B2 * | 1/2011 | Griess | ................. | B64C 1/068 244/120 |
| 8,376,275 B2 * | 2/2013 | Bolukbasi | ................. | B64C 1/062 244/119 |
| 8,388,259 B2 * | 3/2013 | Amengual Pericas | ................. | E01F 15/146 404/6 |
| 8,439,307 B2 * | 5/2013 | Westphal | ................. | B64C 1/061 244/121 |
| 9,086,110 B2 * | 7/2015 | Guimard | ................. | F16F 7/127 |
| 9,593,740 B2 | 3/2017 | Stauffer et al. | | |
| 9,777,479 B2 * | 10/2017 | Rice | ................. | E04B 1/24 |
| 10,131,092 B1 * | 11/2018 | Cook | ................. | B29C 66/439 |
| 2007/0114331 A1 * | 5/2007 | Poggi | ................. | B64C 1/062 244/117 R |
| 2008/0093503 A1 * | 4/2008 | Cacciaguerra | ................. | B64C 1/062 244/119 |
| 2011/0042513 A1 * | 2/2011 | Milliere | ................. | B64C 1/062 244/121 |
| 2017/0106964 A1 | 4/2017 | Ludin et al. | | |

FOREIGN PATENT DOCUMENTS

EP 3098473 A1 11/2016
GB 2444645 A 6/2008

OTHER PUBLICATIONS

Muller, D et al., "Analysis and Full-Scale Crash Test of the NH90 Transport Helicopter Fuselage,", 29th European Rotorcraft Forum, Sep. 16-18, 2003, Friedrichshafen, Germany.

* cited by examiner

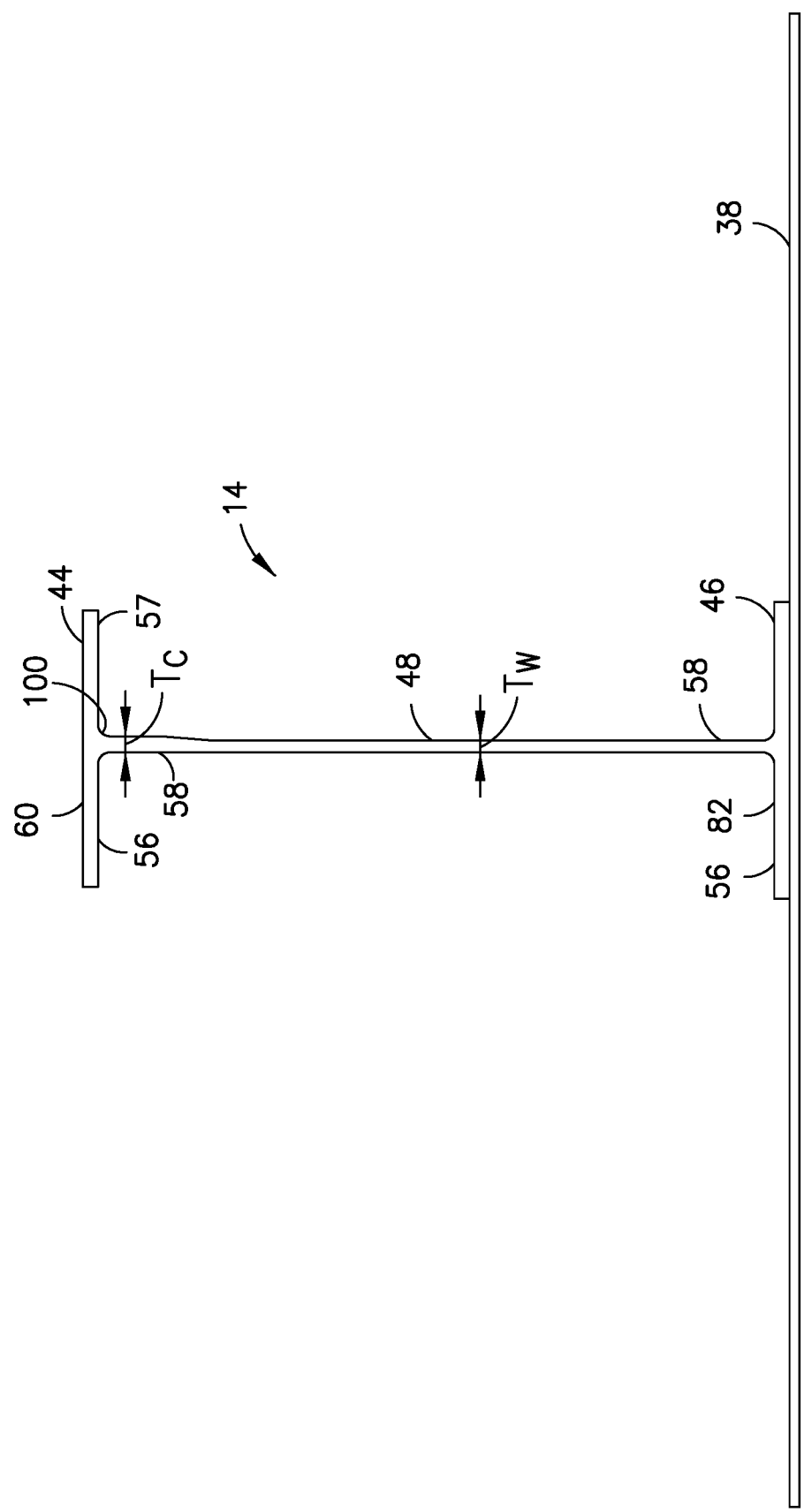

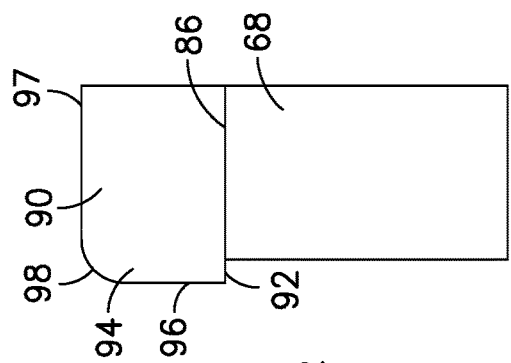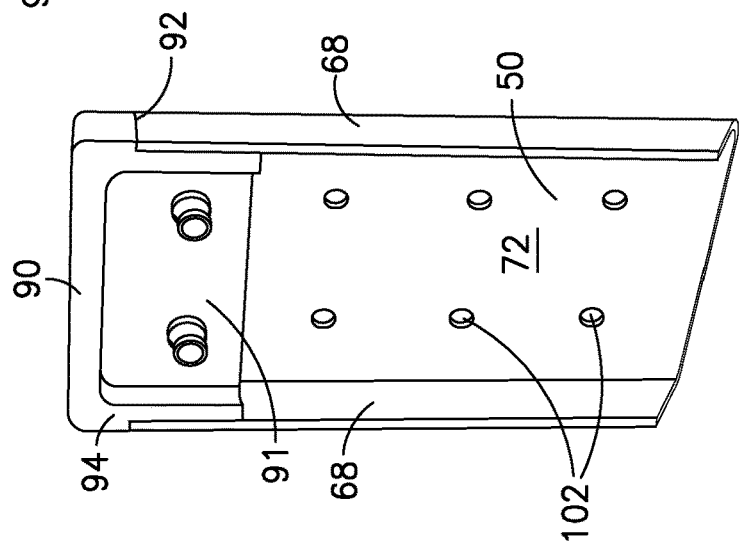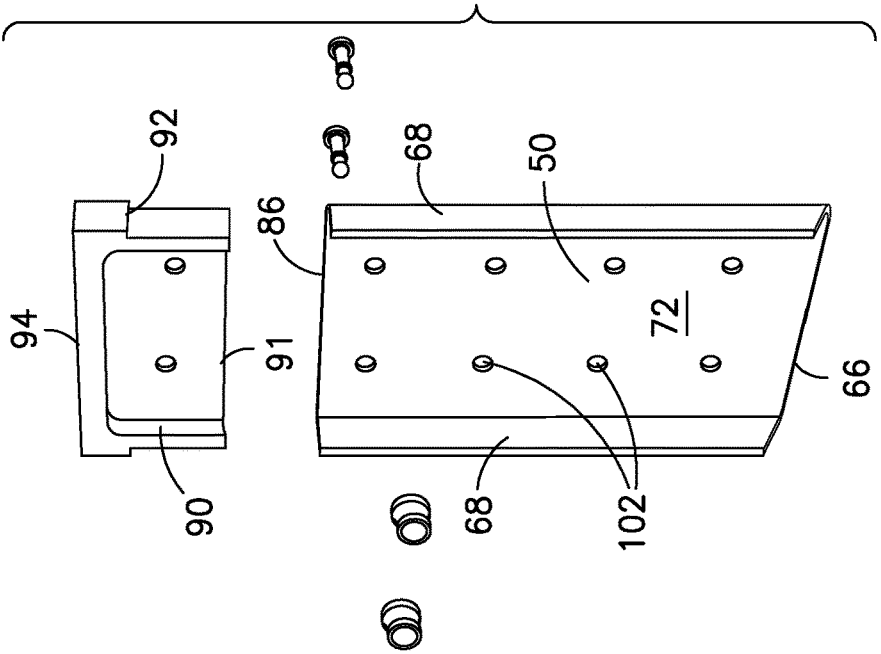

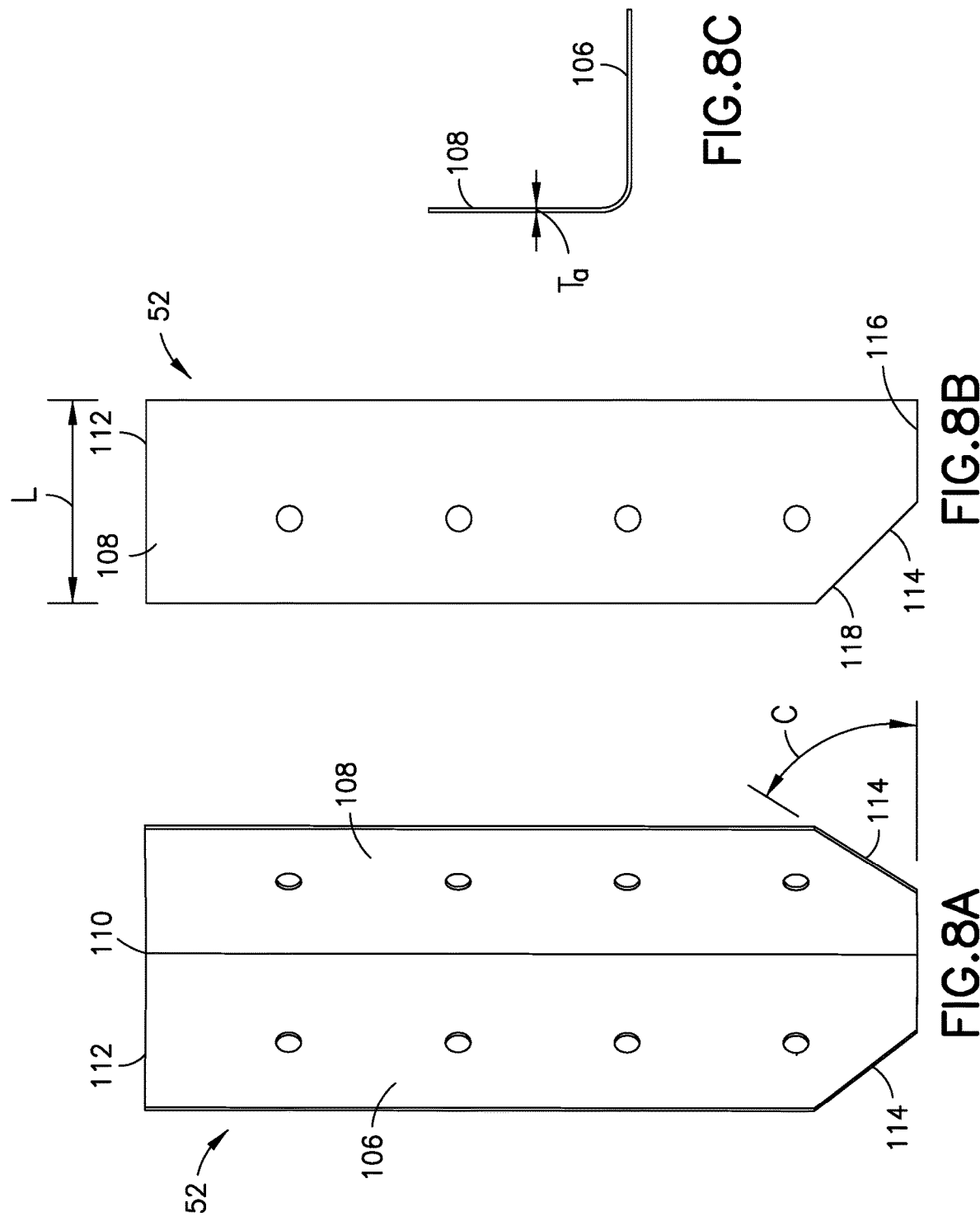

ENERGY-ABSORBING UNDER-FLOOR AIRFRAME

TECHNICAL FIELD

This disclosure relates generally to structural assemblies and, more particularly, to composite structural members and arrangements of such structural members to form a composite multi-functional structural assembly.

BACKGROUND

Structural assemblies suitable for under-floor airframes are designed to carry aircraft flight loads, such as flight deck loads, passenger compartment loads and cargo hold loads, and are typically equipped with additional energy-absorbing systems, structures or mechanisms for absorbing energy under compression loading, such as during hard landing or crash situations. For example, in vertical-lift aircraft (i.e., rotorcraft), which generally have a shallow under-floor depth, are subject to high vibratory loads, and may be subjected to significant vertical impact during hard landing or crash situations, the following solutions have been employed for energy absorption: (i) deployable/extendable energy-absorbing devices; (ii) vehicle-level air bag systems; and (iii) modifications to airframe structures, such as structures featuring energy-absorbing tubes, sine wave shaped beams, corrugated shaped beams, conosoid shaped beams and honeycomb core structures. Such energy-absorbing systems, structures or mechanisms add parasitic weight to an aircraft, present space and structural integration issues, and have increased production and/or maintenance costs.

The majority of military rotorcraft have metallic under-floor airframe structures comprised of frames, formers and longerons with cross-sections in the shape of an "I", "J" or "Z" (also referred to as "I-beam," "J-beam" and "Z-beam" cross-sectional shapes), and which are formed from either sheet metal or high-speed machining of metal billets. Composite materials are increasingly being used in airframe designs for both weight and cost savings. Structures formed of composite material are advantageous due to their high strength-to-weight ratio, favorable corrosion resistance, and high specific energy-absorbing capability during compression-loading events. Compared to metals, composite materials are typically brittle and do not exhibit plasticity or high elongation prior to failure. Composite structures may be formed by laying up composite plies comprised of reinforcing fibers embedded in a polymer matrix. Composite structures are typically designed to transmit loads along the length of the reinforcing fibers. Loads from one fiber may be transferred to another fiber in the same layer or to fibers in an adjacent layer by passing through the matrix material. However, the matrix is typically weaker than the fibers such that when a sufficiently-high load is placed on the composite structure in an out-of-plane direction or in a direction non-parallel to the fibers, the matrix may fail.

In conventional composite structures, the composite plies are typically aligned with and define the outer geometry of the structure. However, a composite structure may be subjected to loads that are oriented non-parallel to the fibers and/or in an out-of-plane direction relative to the plane of the composite plies. Such non-parallel and out-of-plane loads may result in interlaminar tension effects that may exceed the load-carrying capability of the composite structure. To avoid overloading the composite structure, additional composite plies may be required which may increase the weight and complexity of the composite structure.

SUMMARY

A composite structural member and an arrangement of such composite structural members are disclosed herein to provide a multi-functional under-floor airframe that reacts flight, handling and internal cargo loads, and is capable of absorbing energy when subjected to vertically applied compression loads, such as loads that may be applied in hard landing or crash situations. The composite structural member and arrangement of such composite structural members add no parasitic weight to the aircraft, i.e., there is no need for additional energy-absorbing systems, structures or mechanisms; and are lighter weight as compared to metal. The composite structural member and related parts of the arrangement of such composite structural members are designed to progressively collapse throughout the stroke (or displacement) that occurs when a dynamic compressive load is applied to the structural member and to work together with crashworthy seats to mitigate injuries to occupants. Thus, the composite structural member and arrangement of such composite structural members provide at least an equivalent level of safety from compressive loads as compared to metal airframe, with less weight.

In accordance with one aspect of the disclosure, a composite structural member for an aircraft frame comprises an upper cap and a lower cap each having a horizontal portion and a vertical portion. The vertical portions of the upper cap and the lower cap are interconnected by a vertical web to form an I-beam cross-sectional shape. The vertical web has a web thickness that is less than a cap thickness of the vertical portion of the upper cap and the vertical portion of the lower cap, which permits the vertical web to buckle under compressive loads transmitted to a top surface of the upper cap and puts the vertical web into compression between the upper cap and the lower cap. Thus, the vertical web is designed to fail under compressive loads. This approach minimizes the load spike that can occur during initial buckling, which is typical of metal and other rigid types of materials when subjected to a compressive load.

One or more stiffeners are positioned on at least one side of the vertical web and have a C-channel shaped cross-section with an intermediate portion positioned against the side of the vertical web and two side portions extending in a generally perpendicular direction away from the intermediate portion and the vertical web. A top end of the stiffeners is positioned proximate the horizontal portion of the upper cap. A bottom end of the stiffeners has a chamfered edge forming a bottom surface of the two side portions having an acute angle of about 30° to about 60° relative to a top surface of the lower cap. The chamfered edge forms a trigger that initiates progressive collapse or crushing of the stiffeners when the stiffeners are moved down as a result of the designed failure of the vertical web so the trigger interacts with an upper surface of the lower cap. The designed failure of the vertical web to carry the load during a compression load prevents interaction between the vertical web and the stiffeners, allowing the stiffeners to act independently. In some embodiments, a single stiffener may be used to stiffen the vertical web. In other embodiments, a symmetrical pair of stiffeners may be arranged in a back-to-back relationship with the vertical web between the intermediate portion of each of the pair of stiffeners. This configuration acts to further stabilize and prevent rotation of the stiffeners when driven down by a compressive load.

In accordance with another aspect of the disclosure, the composite structural member includes a crush fitting having a shoulder positioned tightly between the top end of the stiffeners and a bottom surface of the upper cap. Alternatively, the crush fitting may be formed integral to the stiffeners. A rear, top portion of the crush fitting has a fillet radius nested into a radius corner between the horizontal portion and the vertical portion of the upper cap. The crush fitting introduces a crushing force at the top of the stiffeners opposite the trigger at the bottom chamfered edge of the stiffeners and supports the two side portions of the stiffeners that extend away from the vertical web and the intermediate portion of the stiffeners.

Another aspect of the disclosure is a structural arrangement for energy absorption. In the structural arrangement, a first pair of substantially parallel composite structural members are arranged orthogonal to and intersecting a second pair of substantially parallel composite structural members to form a box or grid structure. Each of the composite structural members of the first pair and the second pair is configured as disclosed above with an I-beam cross-sectional shape having an upper cap and a lower cap interconnected by a vertical web. The vertical web has a web thickness that is less than a cap thickness of a vertical portion of the upper cap and the lower cap. One or more stiffeners as disclosed above is positioned on the vertical web in each of the composite structural members of the first pair of composite structural members. It is not necessary for the composite structural members of the second pair to be stiffened, but the second pair may include stiffeners as disclosed herein if appropriate for the intended use. The composite structural members of the first pair may also include a crush fitting as disclosed above.

In this aspect of the disclosure, the composite structural members of the first pair are connected to the composite structural members of the second pair with a plurality of shear tie angles secured to each intersection of composite structural members of the first pair and the second pair to form joints having a cruciform configuration. The shear tie angles provide reinforcement at the joints to tension and shear loads exerted on the joints and absorb energy under compression loading. The shear tie angles have a first planar portion and a second planar portion interconnected by a bend radius. The first planar portion is connected to an end of one of the composite structural members of the first pair, and the second planar portion is connected to an end of one of the composite structural panels of the second pair, such that a top surface of the shear ties is positioned tightly against the lower surface of the upper cap of the composite structural members. The first planar portion and the second planar portion of the shear ties have a chamfered bottom edge with an acute angle relative to the lower cap of about 30° to about 60°, which acts as a trigger like the chamfered edge at the bottom of the stiffeners.

One application for the structural arrangement for energy absorption is an under-floor airframe for an aircraft that mitigates damage when the under-floor airframe is subjected to vertically applied compressive loads through the aircraft floor, such as loads that may occur during hard landing or crash of a rotorcraft.

In yet another aspect of the disclosure, a method is disclosed for absorbing energy in a composite structural arrangement when the structural arrangement is subjected to a vertically applied compressive load. The method includes the steps of: (i) forming composite structural members having an I-beam cross-section with an upper cap and a lower cap interconnected by a vertical web having a web thickness that is less than a cap thickness of a vertical portion of the upper cap and the lower cap as disclosed above; (ii) positioning a stiffener on at least one side of the vertical web in a first pair of the composite structural members, the stiffener having a C-channel cross-sectional shape with an intermediate portion positioned against the side of the vertical web and two side portions extending away from the back panel and the vertical web, such that a top portion of the stiffener is positioned proximate the horizontal portion of the upper cap; (iii) forming a chamfered edge at a bottom end of the two side portions with an acute angle relative to a top surface of the lower cap; (iv) arranging the first pair of composite structural members substantially parallel to each other and orthogonal to a second pair of substantially parallel composite structural members; and (v) connecting the composite structural members of the first pair to the composite structural members of the second pair with a plurality of shear tie angles each having a first planar portion and a second planar portion interconnected by a bend radius, the first planar portion and the planar portion having a chamfered bottom edge with an acute angle relative to the lower cap. The method may also include the step of positioning a crush fitting having a shoulder between the top end of the stiffener and a bottom surface of the upper cap, or integrally forming the crush fitting with the stiffener.

The features, functions and advantages that have been discussed, as well as other objects, features, functions and advantages of the composite structural member and arrangement of composite structural members can be achieved independently in various examples of the disclosure or may be combined in yet other examples, further details of which can be seen with reference to the following description and drawings.

BRIEF DESCRIPTION OF DRAWINGS

FIG. 3B is a cross-sectional view of the composite structural member taken along the lines 3B-3B shown in FIG. 3A.

FIG. 6A is an exploded perspective view of a stiffener and a crush fitting in an unassembled state.

FIG. 6B is a perspective view of the stiffener and crush fitting shown in FIG. 6A in an assembled state.

FIG. 6C is a left side partial elevation view of the stiffener and crush fitting in an assembled state.

FIG. 8A is a front elevation view, showing an inner surface, of a shear tie used for connecting intersecting composite structural members.

FIG. 8B is a right-side elevation view, showing an outer surface, of the shear tie shown in FIG. 8A.

FIG. 8C is a top plan view of the shear tie shown in FIG. 8A.

DETAILED DESCRIPTION

In the following detailed description, various examples of composite structural members and arrangements of composite structural members to form composite multi-functional structural assemblies for use as energy-absorbing under-floor airframes are described and shown with reference to aerospace structures, and more particularly to vertical lift aircraft, such as rotorcraft or helicopters, to illustrate the general principles of the present disclosure. The description is merely exemplary in nature and is not intended to limit the disclosed composite structural members and arrangements of composite structural members, or the application and uses of the disclosed composite structural members and arrangements of composite structural members disclosed. It will be recognized by one skilled in the art that the present disclosure may be practiced in other analogous applications or environments and/or with other analogous or equivalent variations of the illustrative examples. For example, the teachings of this disclosure may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures that may experience substantial compression loads. It should be noted that those methods, procedures, components, or functions which are commonly known to persons of ordinary skill in the field of the disclosure are not described in detail herein.

Figure 1:
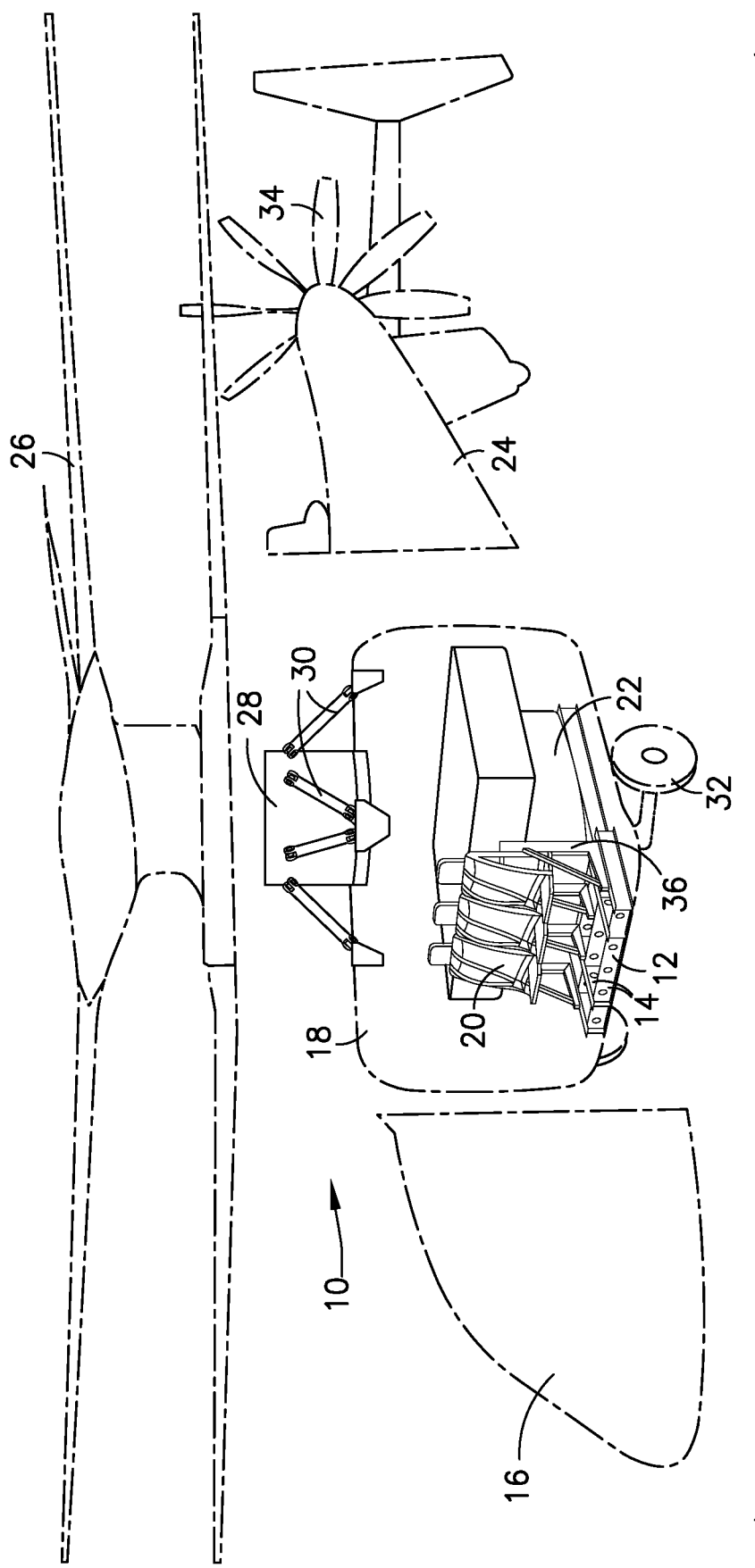
FIG. 1 is an exploded view of a rotorcraft in dashed lines having an energy-absorbing under-floor airframe formed by an arrangement of the disclosed composite structural members.

Referring now to the drawings, which are for purposes of illustrating various non-limiting, exemplary embodiments of the disclosure, FIG. 1 shows a vertical-lift type of aircraft 10 (in this example, a rotorcraft or helicopter) which may incorporate an energy-absorbing under-floor airframe 12 formed by an arrangement of the disclosed composite structural members 14. The aircraft 10 may include a front fuselage 16, a main fuselage 18 and a tail 24. The main fuselage 18 houses a plurality of seats 20, electrical and mechanical controls, and a fuel cell bay preferably housed within a hydrodynamic pressure compliant structure 22. The front fuselage 16 houses a cockpit, which may also include a plurality of seats 20. A main rotor 26 is operatively coupled to the top of the main fuselage 18 through a rotor mast 28 and energy-absorbing struts 30 are provided to further support the main rotor 26 and absorb vertically applied compression loads. Landing gear 32 is operatively coupled to the bottom of the main fuselage 18. A tail rotor 34 is operatively coupled to the tail 24. The seats 20 are supported by seat posts 36, which are secured to an upper surface of the energy-absorbing under-floor airframe 12 through an internal floor system or panel (not shown) in a manner that prevents lateral movement and vertically-upward movement of the seats 20 such as during flight. The hydrodynamic pressure compliant structure 22 and other structures may also be secured to the energy-absorbing under-floor airframe 12 through the internal floor system in a manner that prevents lateral movement and vertically-upward movement of the seats 20 such as during flight.

Figure 2:
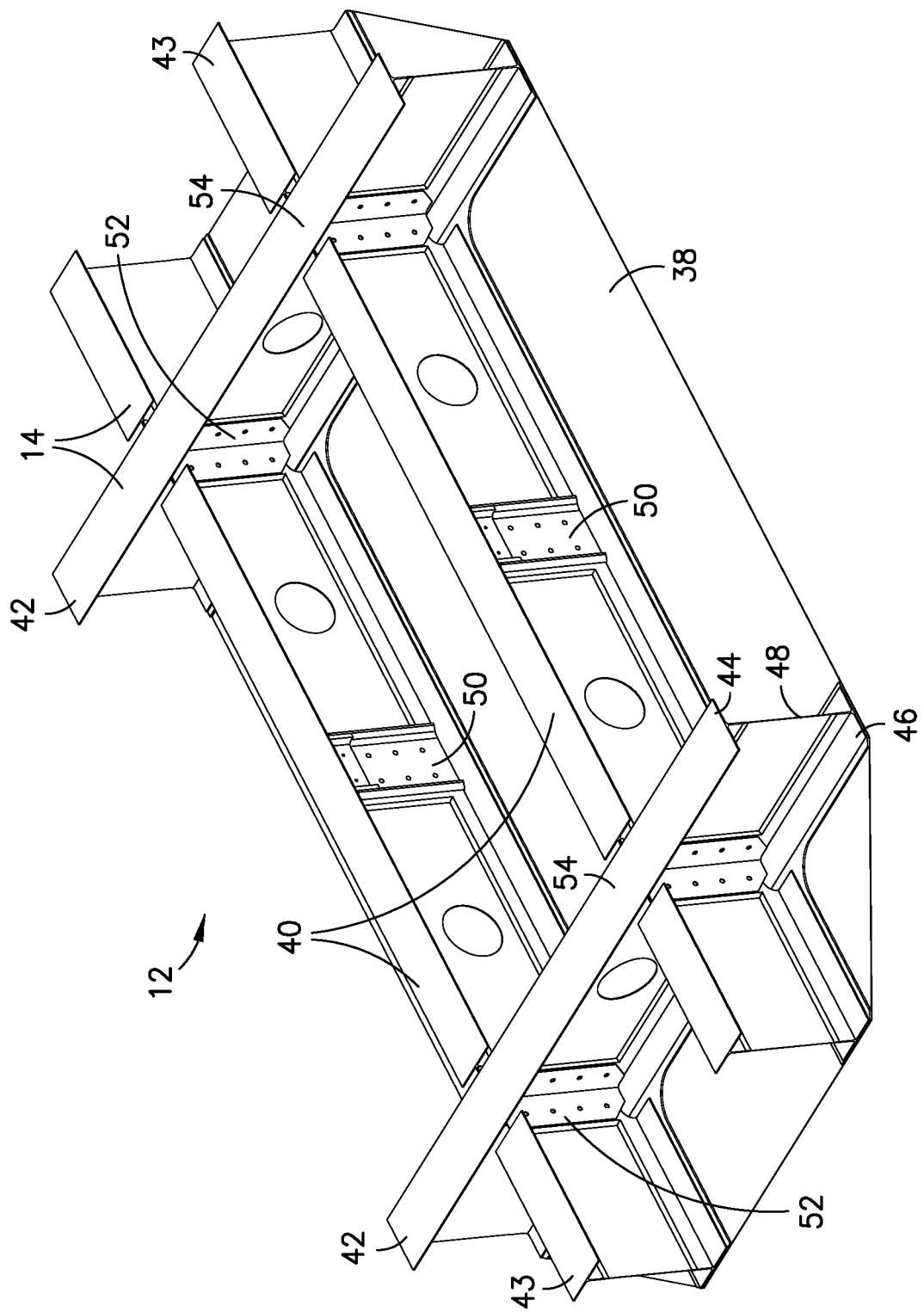
FIG. 2 is a perspective view of a portion of the energy-absorbing under-floor airframe shown in FIG. 1 with a bottom skin.

FIG. 2 shows a portion of the energy-absorbing under-floor airframe 12 with an aircraft outer skin 38 bonded to a lower surface thereof. The energy-absorbing under-floor airframe 12 is multi-functional with the ability to react flight, handling and internal cargo loads, as well as absorb energy when subjected to vertically applied compression loads, such as loads that may be applied during hard landing or crash situations. The energy-absorbing under-floor airframe 12 also adds no parasitic weight to the aircraft 10, i.e., there is no need for additional energy-absorbing systems, structures or mechanisms, which could add up to about 400 pounds to the aircraft weight; and is therefore lighter weight as compared to metal. Preferably, the energy-absorbing under-floor airframe 12 is constructed of multi-directional composite materials having composite fibers oriented in a vertical direction and in directions angled at 45°-90° from vertical. Composite materials suitable to form the energy-absorbing under-floor airframe 12 can be constructed using traditional composite layup techniques, such as manually placing plies over a mandrel to form a desired shape, or using automated ply placement techniques such as braiding, automated fiber placement (AFP) or any combination of these methods. Examples of such composite materials include standard or intermediate modulus composite fiber reinforcements available from Hexcel Corporation or Cytec Solvay Group, although other equivalent materials could be employed in the construction of the energy-absorbing under-floor airframe 12.

The energy-absorbing under-floor airframe 12 comprises a box- or grid-shaped structural arrangement of a plurality of composite structural members 14 where at least a first pair 40 of substantially parallel composite structural members 14 are arranged orthogonal to and intersecting at least a second pair 42 of substantially parallel composite structural members 14. The composite structural members 14 of either the first pair 40 or the second pair 42 may be arranged in a longitudinal or lengthwise direction (e.g., a forward-aft direction) of the main fuselage 18 or in a transverse direction across a width of the main fuselage 18. In the example shown in FIGS. 1 and 2, the energy-absorbing under-floor airframe 12 is positioned with the first pair 40 of composite structural members 14 in the transverse direction and the second pair 42 in the longitudinal or lengthwise direction. The composite structural members 14 of the second pair 42 are configured as keel beams with the composite structural members 14 of the first pair 40 extending between the keel beams. Stub beams 43 are positioned in-line with the composite structural members 14 of the first pair 40 and on an outer side of the structural member 14 of the second pair 42, as shown in FIG. 2.

Each of the composite structural members 14 is generally configured with an I-beam cross-sectional shape having an upper cap 44 and a lower cap 46 interconnected by a vertical web 48. One or more stiffeners 50 is positioned on the vertical web 48 in each of the composite structural members 14 of at least the first pair 40 of composite structural members 14. The composite structural members 14 of the first pair 40 are connected to the composite structural members 14 of the second pair 42 with a plurality of shear tie angles 52 secured to each intersection of composite structural members 14 of the first pair 40 and the second pair 42 to form joints 54 having a cruciform configuration. The shear tie angles 52 provide reinforcement at the joints 54 to tension and shear loads exerted on the joints 54 and absorb energy under compression loading.

Figure 3A:
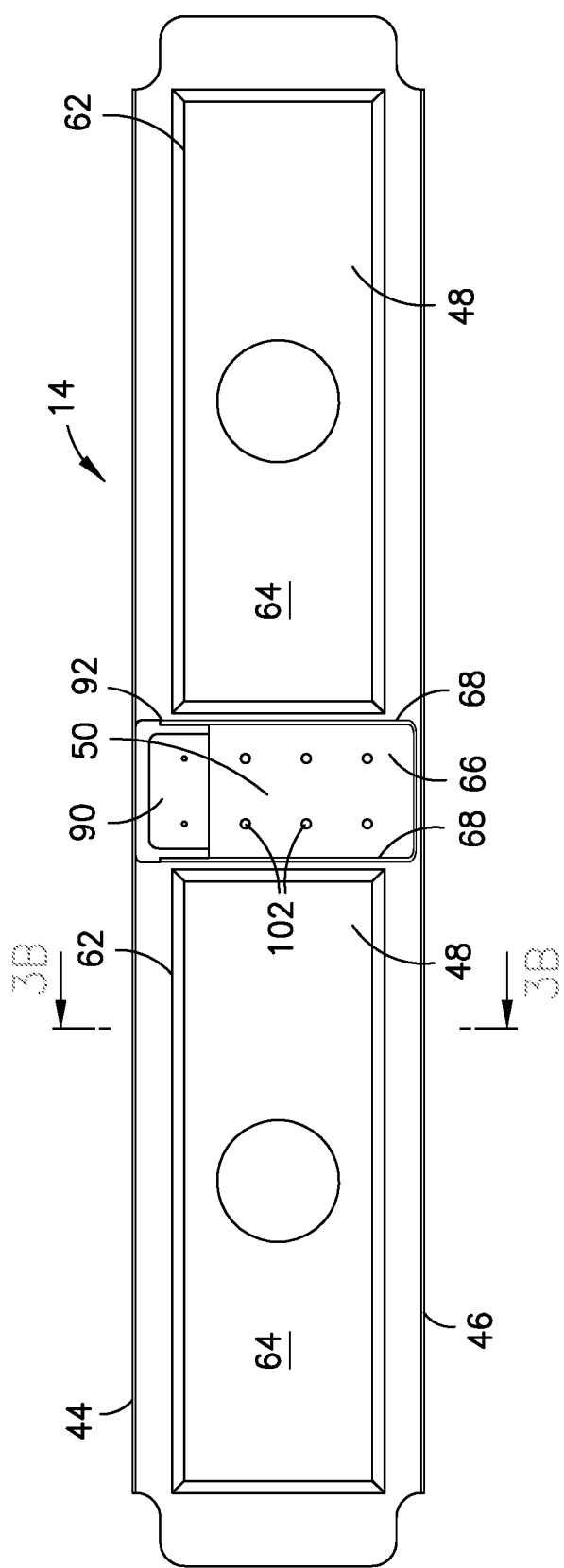
FIG. 3A is an elevation view of a composite structural member with a stiffener and crush fitting positioned on a vertical web of the composite structural member.

The composite structural members 14 and stiffeners 50 will be described in more detail with reference to FIGS. 3A, 3B, 4A, 4B and 5. Referring first to FIG. 3B (a cross-section of the composite structural member 14 shown in FIG. 3A), the upper cap 44 and lower cap 46 in the composite structural members 14 each have a horizontal portion 56 and a vertical portion 58. The vertical portion 58 extends in a generally perpendicular direction from about the midpoint of the horizontal portion 56. The vertical portion 58 of the upper cap 44 and the vertical portion 58 of the lower cap 46 are interconnected by a vertical web 48 to form a composite structural member 14 with an I-beam cross-sectional shape wherein the vertical web 48 effectively carries shear load between the upper cap 44 and the lower cap 46. This general structure is sometimes referred to as an Intermediate-Diagonal Tension (or IDT) frame.

The vertical web 48 is designed to fail under compressive loads. The vertical web 48 has a web thickness $T_w$ that is less than a cap thickness $T_c$ of the vertical portion 58 of the upper cap 44 and the vertical portion 58 of the lower cap 46, which permits the vertical web 48 to buckle under compressive loads, such as loads resulting from an aircraft crash or hard landing, that are transmitted to the energy-absorbing under-floor airframe 12 and to a top surface 60 of the upper cap 44. In some embodiments, a ratio of the web thickness $T_w$ to the cap thickness $T_c$ is in the range of about 0.4 to 0.8, preferably about 0.6. For example, the cap thickness $T_c$ may be about 0.080 inch and the web thickness $T_w$ may be in the range of about 0.04 inch to about 0.065 inch, preferably about 0.050 inch. This approach puts the vertical web 48 into compression between the upper cap 44 and the lower cap 46 and minimizes the load spike that can occur during initial buckling, which is typical of metal and other rigid types of materials. The composite structural members 14 formed as disclosed also carry load even when the vertical web 48 has taken on significant deflection or buckling.

Figure 5:
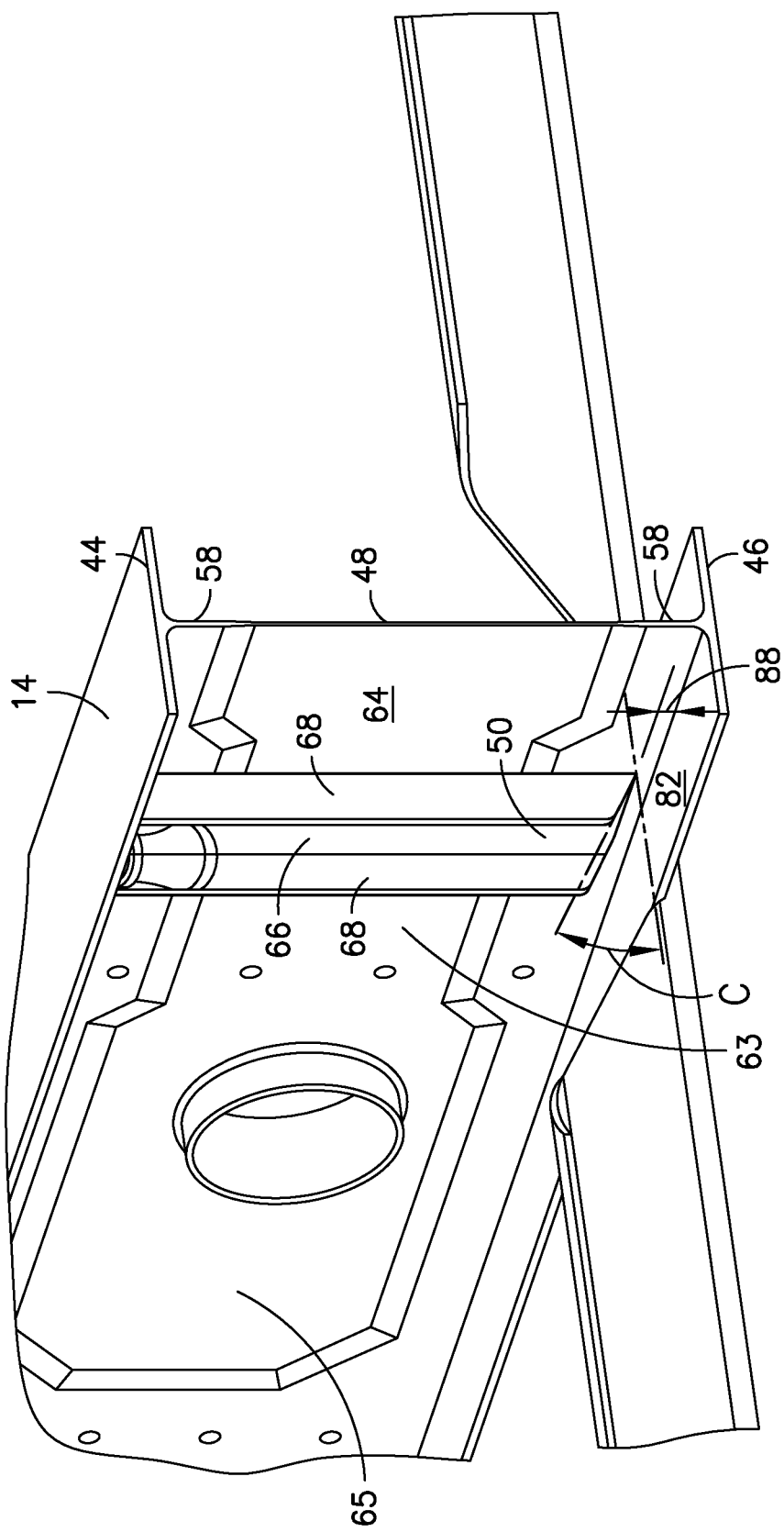
FIG. 5 is a perspective view of a section of a composite structural member with a stiffener and crush fitting positioned on a vertical web of the composite structural member.

The vertical web 48 may be formed with a reduced web thickness $T_w$ along the entire length of the composite structural member 14, or the composite structural member 14 may be formed with one or more discrete sections 62 where the vertical web 48 has a reduced web thickness $T_w$, as shown in FIG. 3A. The discrete sections 62 may be rectangular as shown in FIG. 3A, or may be formed in other shapes suitable for the intended purpose, for example a shape having multiple edges forming areas 63, 65 along the length of the composite structural member 14 where the height of the vertical web 48 varies as shown in FIG. 5.

The vertical webs 48 in at least the first pair 40 of composite structural members 14 are stiffened with one or more stiffeners 50 positioned on at least one side surface 64 of the vertical web 48 between the upper cap 44 and lower cap 46. In general, the height of the vertical web 48 is taller in locations (i.e., discrete sections 62) where the stiffeners 50 are positioned and shorter in locations between the stiffeners 50. In some embodiments, a single stiffener 50 may be used to stiffen the vertical web 48. In other embodiments, a symmetrical pair of stiffeners 50 is arranged in a back-to-back relationship with the vertical web 48 therebetween; having a first stiffener 50 on a first side surface 64 of the vertical web 48 and a second stiffener 50 on a second side surface 64 opposite the first side surface 64. This configuration further stabilizes and prevents rotation of the stiffeners 50 when they are driven down by a compressive load applied to the energy-absorbing under-floor airframe 12. The stiffeners 50 may be positioned anywhere along the length of the composite structural member 14. For example, the stiffeners 50 may be spaced evenly along the length of the composite structural member 14 when a rigid passenger/cargo floor is placed above the energy-absorbing under-floor airframe 12 because such a floor provides an evenly distributed vertically-applied compressive load during a hard landing. The stiffeners 50 may also be positioned directly under load application points, particularly when there is no rigid floor, such as under the seat posts 36 or a cargo tie-down ring.

Figure 4B:
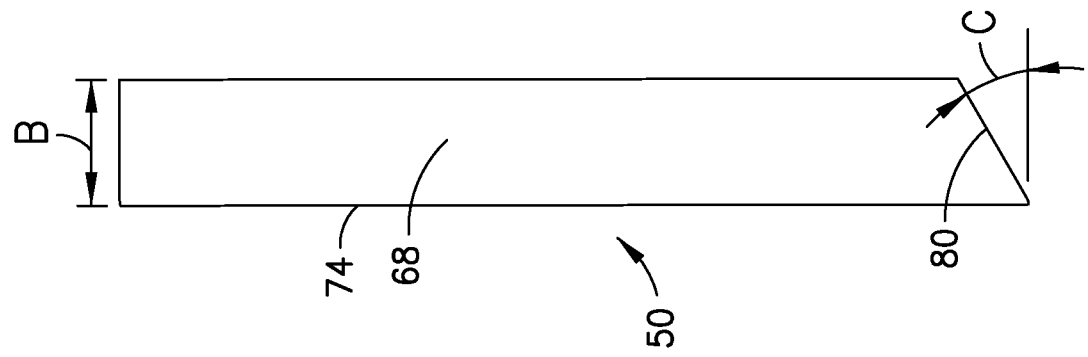
FIG. 4B is a left side elevation view of the stiffener shown in FIG. 4A.
Figure 4A:
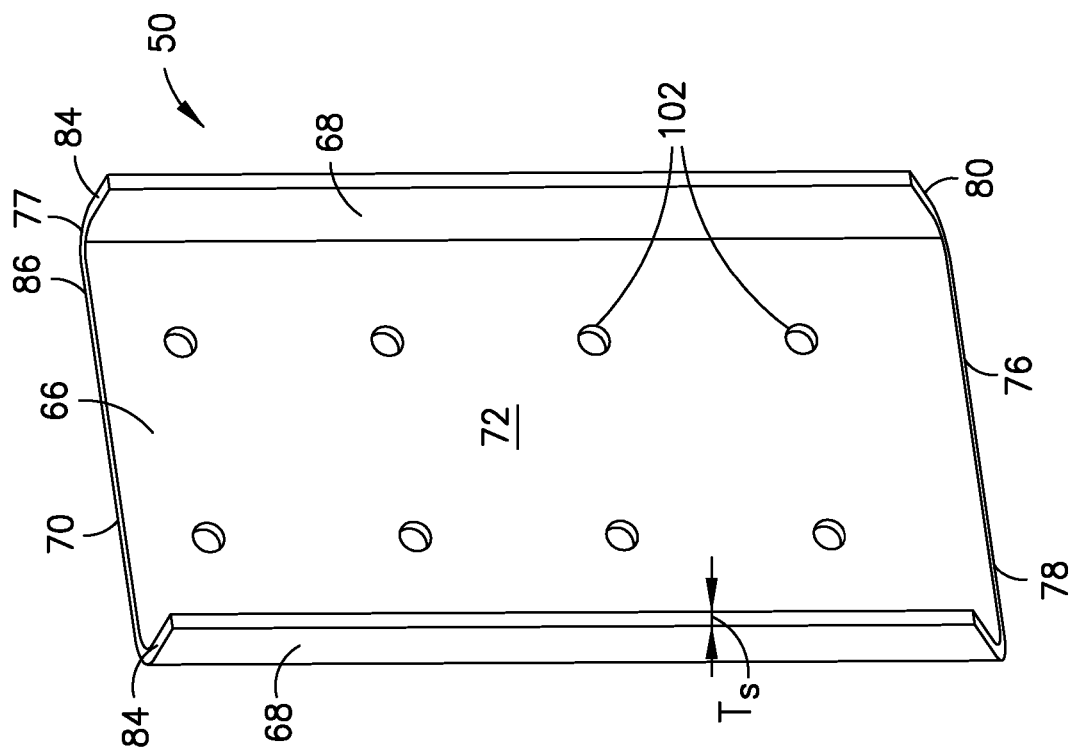
FIG. 4A is a perspective view of a stiffener having a C-channel cross-section.

The stiffeners 50 may be formed in any shape typical of stiffeners for an I-beam cross-sectional shaped structure, such as the composite structural members 14. For example, the stiffeners 50 may be constructed to have a C-channel shape, a J shape, a 90° angle, a hat shape, or a box shape. The drawings, with particular reference to FIGS. 4A and 4B, show a stiffener 50 having a C-channel shaped horizontal cross-section with an intermediate portion 66 positioned against the side surface 64 of the vertical web 48 and two side portions 68 extending in a generally perpendicular direction away from the intermediate portion 66 and the vertical web 48 when installed onto the composite structural member 14 (see, e.g., FIG. 5). The intermediate portion 66 has a generally rectangular configuration with a flat front surface 72 and a flat back surface 74 on opposites surfaces of the intermediate portion 66. The intermediate portion 66 has a length from a bottom end edge 76 to an opposite top end edge 70. The bottom end edge 76 and the top end edge 70 are generally parallel. The intermediate portion 66 has a width between the side portions 68. The side portions 68 are generally parallel to each other and, together with the intermediate portion 66, form rounded back edges 77 of the stiffeners 50. The back edges 77 of the stiffener need not be rounded, i.e., they may be squared off.

A bottom edge 78 of the stiffeners 50 is chamfered by forming a bottom surface 80 of the two side portions 68 with an acute angle C of about 30° to about 60°, and more particularly about 40° to about 50°, and most preferably about 45° relative to a plane of the top surface 82 of the lower cap 46 (see FIG. 4B). The top surface 84 of the two side portions 68 is not chamfered and forms a flat continuous top surface 86 with the top end edge 70 of the intermediate portion.

The stiffeners 50 are constructed by laying up one or more layers of multi-directional carbon-fiber thermoset prepreg tape to a nominal thickness $T_s$ of about 0.090 inch. The carbon fibers are arranged in the prepreg tape in multiple directions, for example, at 0° vertical, 45° and 90° relative to vertical. To avoid local buckling in the stiffeners 50 under compressive loads, to allow the stiffeners 50 to crush evenly, and to improve specific energy absorption in the stiffeners 50, a ratio of the length B of the side portions 68 to the thickness $T_s$ of the stiffeners 50 should be in the range of about 7-10, and more particularly about 7-8. For example, the length B of the side portions 68 can be about 0.7 inch, such that the ratio of $B/T_s$ is about 7.7.

The stiffeners 50 are positioned on the vertical web 48 with the flat back surface 74 of the intermediate portion 66 against the side surface 64 of the vertical web 48 and the continuous top surface 86 positioned proximate to and firmly supported by the horizontal portion 56 of the upper cap 44 of the composite structural member 14. The bottom surface 80 of the side portions 68 and the bottom end edge 76 of the intermediate portion 66 form a free end of the stiffeners 50, which is not firmly supported by the horizontal portion 56 of the lower cap 46. Instead, the bottom end edge 76 of the intermediate portion 66 is spaced apart from the horizontal portion 56 of the lower cap 46 by a trigger distance 88 in the range of about 0.01 to about 0.03 inch such that the intermediate portion 66 of the stiffeners 50 lays flat against side surface 64 of the vertical web 48 without having to accommodate the radius between the horizontal portion 56 and the vertical portion 58 of the lower cap 46. The trigger distance 88 also allows the vertical web 48 to initiate buckling (i.e., a designed failure) before applying load to the stiffeners 50 and reduces initial load spike. The chamfered bottom edge 78 of the stiffeners 50 acts as a trigger that initiates progressive collapse or crushing of the stiffeners 50 when the stiffeners 50 are moved down through the trigger distance 88 as a result of the designed failure of the vertical web 48. The bottom end edge 76 of the intermediate portion 66 interacts with the top surface 82 of the lower cap 46 first, and then the chamfered bottom edge 78 progressively interacts with the top surface 82 of the lower cap 46 to cause a progressive vertical collapse from top to bottom and to minimize the load spike that can occur during initial buckling when the bottom edge is straight. The designed failure of the vertical web 48 to carry a compression load prevents interaction between the vertical web 48 and the stiffeners 50, allowing the stiffeners 50 to act independently to absorb energy.

The stiffeners 50 preferably include a crush fitting 90 at an upper portion of the stiffeners 50 that introduces a crushing force to the continuous top surface 86 of the stiffeners 50 opposite the trigger at the chamfered bottom edge 78 of the stiffeners 50, and supports the side portions 68 of the stiffeners 50, when a compressive load is applied to the composite structural members 14. Referring to FIGS. 3A and 6A-6C, the crush fitting 90 is shown as a separate element having a bottom portion 91 that fits within a space formed by the flat front surface 72 of the intermediate portion 66 and the inner surfaces of the side portions 68 of the stiffeners 50, and a top portion 94 wider than the bottom portion 91 and having a shoulder 92 that rests on the continuous top surface 86 of the stiffeners 50. The shoulder 92 is positioned tightly between the continuous top surface 86 and the horizontal portion 56 of the upper cap 44. The bottom portion 91 maintains the side portions 68 of the stiffeners 50 in their generally perpendicular orientation relative to the intermediate portion 66. Referring to FIG. 6C, a rear of the top portion 94 of the crush fitting 90 has a fillet radius 98 joining a rear surface 96 and a top surface 97 of the top portion 94. The fillet radius 98 is nested into a radius corner 100 between the horizontal portion 56 and the vertical portion 58 of the upper cap 44 (shown in FIG. 3B) to further provide a tight fit between the crush fitting 90 and the composite structural member 14, and to effectively transfer vertical impact load applied to the composite structural member 14 to the stiffeners 50.

The crush fitting 90 may be formed from a machined metallic material, such as aluminum, or from a composite material, for example, injection molded, resin transfer molded, or other types of composite materials. Alternatively, the crush fitting 90 may be formed as an integral part of the composite stiffeners 50 from the same composite material, such that the stiffeners 50 has reinforcing structure at the top of the stiffeners 50.

Figure 7:
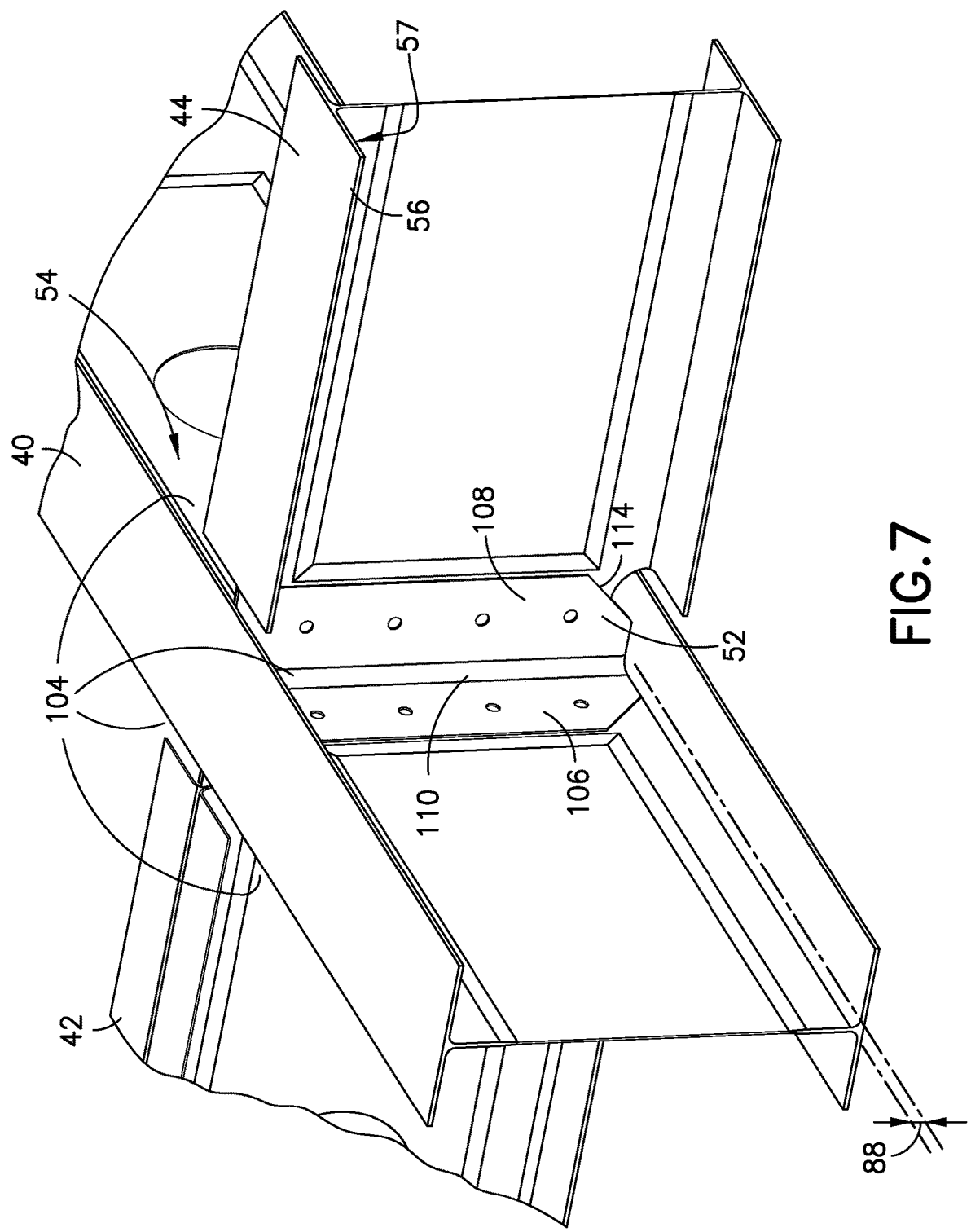
FIG. 7 is perspective view of a cruciform joint formed at an intersection of composite structural members.

Referring to FIG. 7, the composite structural members 14 of the first pair 40 are connected to the composite structural members 14 of the second pair 42 with a plurality of shear tie angles 52 secured to each intersection 104 of composite structural members 14 of the first pair 40 and the second pair 42 to form joints 54 having a cruciform configuration. The shear tie angles 52 provide reinforcement at the joints 54 to tension and shear loads exerted on the joints 54 and absorb energy under compression loading. In FIG. 7, the joint 54 is formed by a continuous composite structural member 14 that is met orthogonally by ends of two additional composite structural members 14 whose vertical webs 48 align in a common plane. Four shear tie angles 52 are used to connect the three composite structural members 14.

Referring to FIGS. 8A-8C, each of the shear tie angles 52 has a first planar portion 106 and a second planar portion 108 interconnected by a bend radius 110 and positioned at about a 90° angle relative to the first planar portion 106. The first planar portion 106 is connected to an end of one of the composite structural members 14 of the first pair 40, and the second planar portion 108 is connected to an end of one of the composite structural members 14 of the second pair 42. A top surface 112 of the shear tie angles 52 is flat and positioned tightly against the bottom surface 57 of the horizontal portion 56 of the upper cap 44 of the composite structural members 14. A lower edge 114 of the shear tie angles 52 forms a free end of the shear tie angles 52, which is not firmly supported by the horizontal portion 56 of the lower cap 46. Instead, similar to the stiffeners 50, the lower edge 114 is spaced apart from the horizontal portion 56 of the lower cap 46 by a trigger distance 88 in the range of about 0.01 to about 0.03 inch such that the first planar portion 106 and second planar portion 108 lay flat against side surface 64 of the vertical web 48 without having to accommodate the radius between the horizontal portion 56 and the vertical portion 58 of the lower cap 46. The trigger distance 88 allows the vertical web 48 to initiate buckling (i.e., a designed failure) before applying load to the shear tie angles 52 and further reduces initial load spike.

Similar to the stiffeners 50, the first planar portion 106 and the second planar portion 108 of the shear tie angles 52 have a lower edge 114 that is chamfered with an acute angle C relative to a plane of the top surface 82 of the lower cap 46 of about 30° to about 60° and more particularly about 40° to about 50°, and most preferably about 45°. The chamfered lower edge 114 acts as a trigger like the chamfered edge at the bottom edge 78 of the stiffeners 50. The chamfered lower edge 114 may include a flat, non-angled portion 116 and an angled portion 118. The length of the non-angled portion 116 should be small enough so the angled portion 118 provides an effective trigger. Alternatively, the chamfered lower edge 114 of the shear tie angles 52 may have only an angled portion 118, similar to the bottom surface 80 of the side portions 68 of the stiffeners 50.

The shear tie angles 52 are constructed by laying up one or more layers of multi-directional carbon-fiber prepreg plain weave fabric a nominal thickness $T_a$ of about 0.033 inch. The carbon fibers are arranged in the prepreg fabric in multiple directions, for example, at 0° vertical, 45° and 90° relative to vertical. To avoid local buckling in the shear tie angles 52 under compressive loads, to allow the shear tie angles 52 to crush evenly, and to improve specific energy absorption in the shear tie angles 52, a ratio of the length L of the first planar portion 106 and the second planar portion 108 to the thickness $T_a$ of the shear tie angles 52 should be in the range of about 0.04 inch to about 0.09 inch, and more particularly about 0.06 inch.

The chamfered lower edge 114 of the shear tie angles 52 acts as a trigger that initiates progressive collapse or crushing of the shear tie angles 52 when the shear tie angles 52 are moved down through the trigger distance 88 as a result of the designed failure of the vertical web 48. The flat, non-angled portion 116 of the lower edge 114 of the shear tie angles 52 interacts with the top surface 82 of the lower cap 46 first, and then the angled portion of 118 progressively interacts with the top surface 82 of the lower cap 46 to cause a progressive vertical collapse of the shear tie angles 52 from top to bottom and minimize the load spike that can occur during initial buckling when the bottom edge is straight. The designed failure of the vertical web 48 to carry a compression load prevents interaction between the shear tie angles 52 and the vertical web 48, allowing the shear tie angles 52 to act independently to absorb energy.

The stiffeners 50, crush fitting 90 and shear tie angles 52 are mounted to the vertical web 48 and upper cap 44 of the composite structural members 14 with mechanical and adhesive means. For example, all contact surfaces between the vertical web 48 and upper cap 44 of the composite structural members 14, the stiffeners 50 and the crush fitting 90 may be bonded together using any aerospace quality past adhesive, such as Loctite EA 9394 AERO Paste Adhesive available from Henkel AG & Co. The crush fitting 90 is further affixed to the stiffeners 50, and the stiffeners 50 and shear tie angles 52 are further affixed to the vertical web 48 of the composite structural members 14, with mechanical fasteners such as Hi-Lites or Hi-Lok straight shank fasteners and fastener collars, or rivets, through a plurality of holes 102 that extend through the intermediate portion 66 of the stiffeners 50. In embodiments where stiffeners 50 are arranged in a back-to-back relationship, the stiffeners 50 are bonded to opposite side surfaces 64 of the vertical web 48 and fastened together through the vertical web 48. Similarly, the shear tie angles 52 are arranged such that the first planar portion 106 of one shear tie angle 52 is in a back-to-back relationship with the second planar portion 108 in a second shear tie angle 52 and bonded to opposite side surfaces 64 of the vertical web 48 and fastened together through the vertical web 48.

Figure 9A:
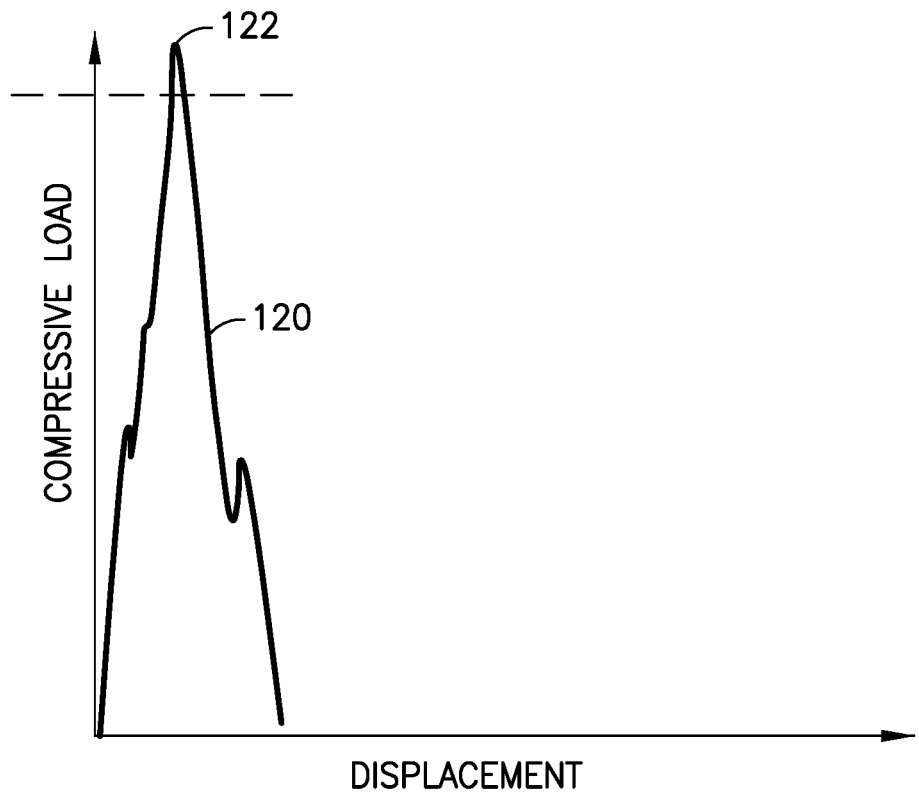
FIGS. 9A and 9B are force-displacement plots comparing energy absorbed during a catastrophic collapse of a structural member versus the energy absorbed during a progressive collapse of a structural member.
Figure 9B:
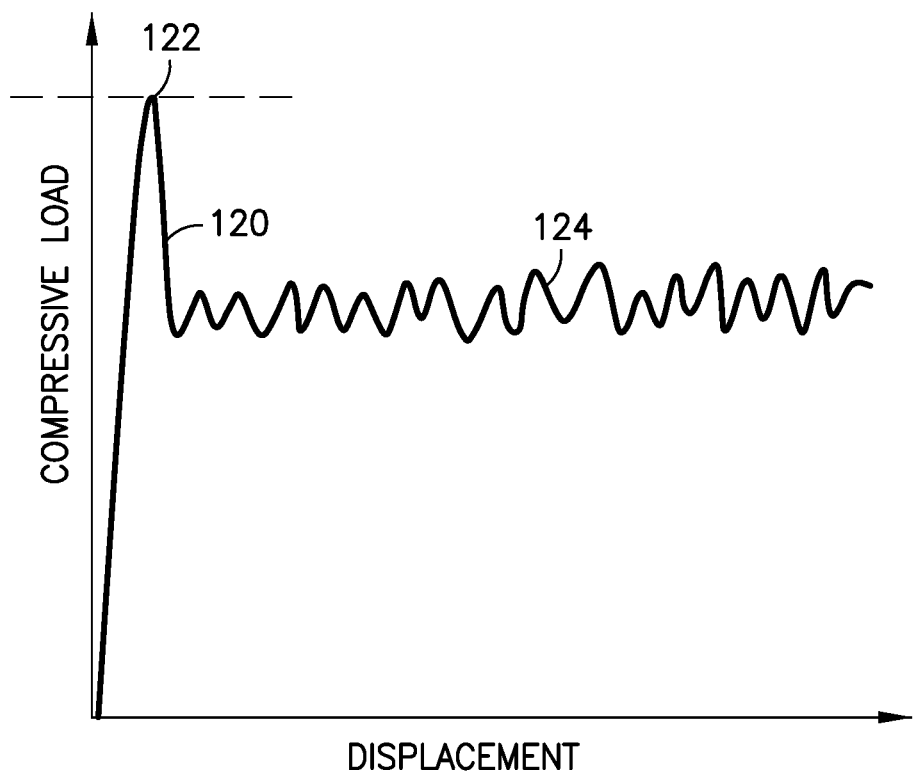
Figure 10:
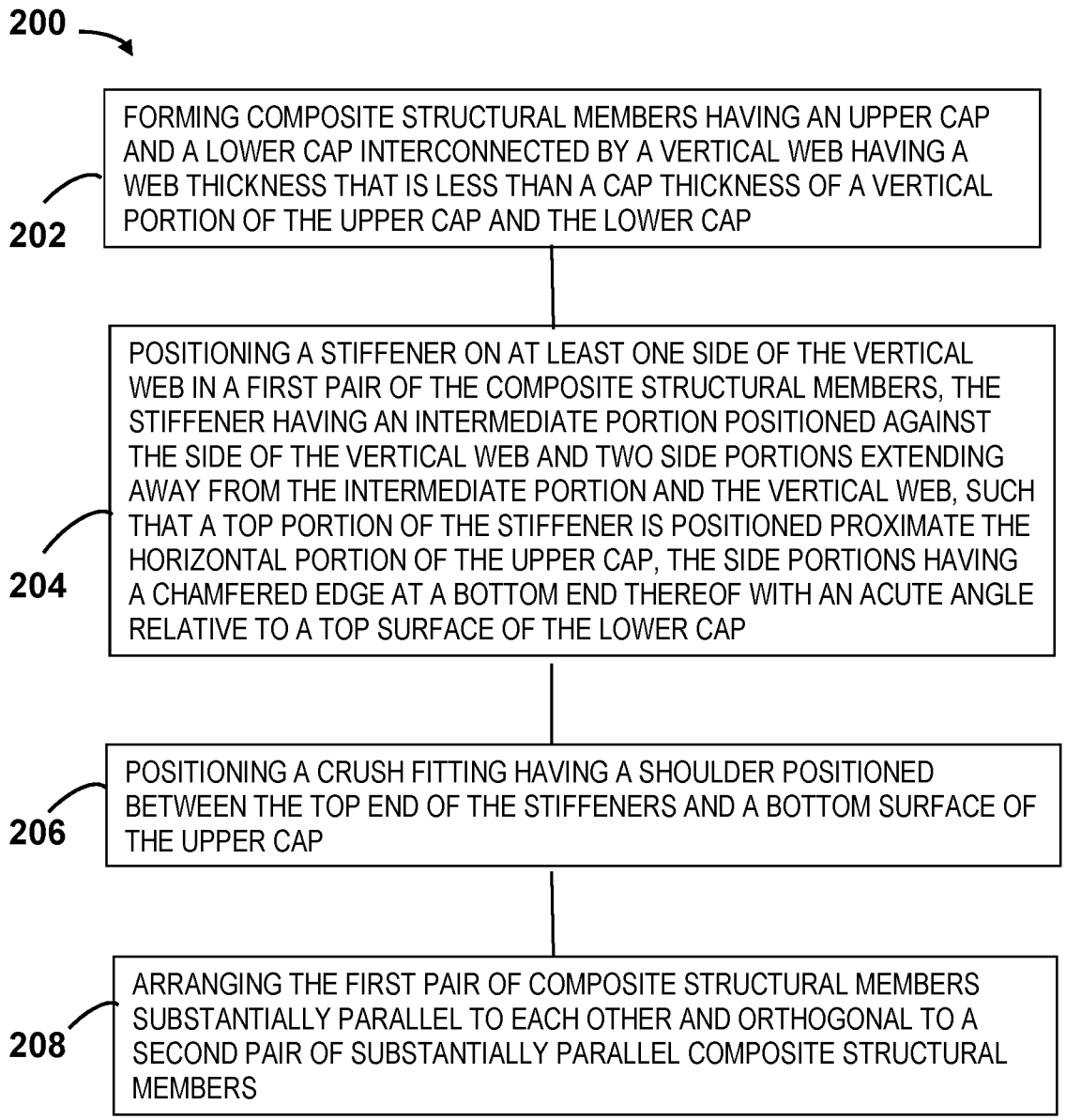
FIG. 10 is a flow chart of a method of absorbing energy in an aircraft.

The disclosed composite structural members 14 and energy-absorbing under-floor airframe 12 formed from the composite structural members 14 provide a steady level load throughout the compressive load spike, and therefore provide a progressive crushing when subjected to a compressive load. FIGS. 9A and 9B are comparative force-displacement (F-D) plots, where the total energy absorbed by the energy-absorbing under-floor airframe 12 is equal to the product of the compressive load force (on the Y-axis) and the displacement (on the X-axis), i.e., the area under the F-D curve. The goal for progressive collapse is to maximize the area under the F-D curve 120. FIG. 9A is an F-D plot for a typical under-floor airframe under a compressive load, having an initial load spike 122 that causes buckling and catastrophic collapse. FIG. 9B is an F-D plot for the energy-absorbing under-floor airframe 12 under a compressive load, having a lower initial load spike 122 and an average crush load 124 spread out over the displacement, resulting in a steady, progressive collapse of the energy-absorbing under-floor airframe 12. The energy from the compressive load is attenuated by the structure of the energy-absorbing under-floor airframe 12.

The energy-absorbing under-floor airframe 12 therefore includes simple structural elements that are easily integrated into the energy-absorbing under-floor airframe 12 to handle flight, handling, and cargo loads as well as absorbing energy from a compressive load to provide for a controlled and progressive crush of the energy-absorbing under-floor airframe 12. The vertical web 48 in the composite structural members 14 is designed to buckle at relatively low compressive load during an aircraft hard landing or crash. The stiffeners 50 and the shear tie angles 52 are designed for dual use, i.e., to stiffen and structurally connect the composite structural members 14 of the energy-absorbing under-floor airframe 12, and to absorb energy by progressively crushing to permit the energy-absorbing under-floor airframe 12 to undergo a controlled failure during a compressive load. Thus, the composite structural member 14 and arrangement of such composite structural members 14 provide at least an equivalent level of safety from compressive loads as compared to metal airframe, with less weight.

In another aspect of the disclosure, a method 200 is disclosed for absorbing energy in a composite structural arrangement, such as the energy-absorbing under-floor airframe 12, when the structural arrangement is subjected to a vertically applied compressive load. In step 202 of the method, composite structural members 14 are formed having an I-beam cross-section with an upper cap 44 and a lower cap 46 interconnected by a vertical web 48 having a web thickness $T_w$ that is less than a cap thickness $T_c$ of a vertical portion 58 of the upper cap 44 and the lower cap 46 as disclosed above. In step 204, a stiffener 50 is positioned on at least one side of the vertical web 48 in a first pair 40 of the composite structural members 14, the stiffener 50 having a C-channel cross-sectional shape with an intermediate portion 66 positioned against the side surface 64 of the vertical web 48 and two side portions 68 extending away from the intermediate portion 66 and the vertical web 48, such that a top portion of the stiffener 50 is positioned proximate the horizontal portion 56 of the upper cap 44, and a chamfered bottom end edge 76 is formed at a bottom end of the two side portions 68 with an acute angle C relative to a top surface 82 of the lower cap 46. In step 206, a crush fitting 90 having a shoulder 92 is positioned between the continuous top surface 86 of the stiffeners 50 and a bottom surface 57 of the horizontal portion 56 of the upper cap 44, or integrally formed with stiffener 50. In step 208, the first pair 40 of composite structural members 14 is arranged substantially parallel to each other and orthogonal to a second pair 42 of substantially parallel composite structural members 14, and connected to each other with a plurality of shear tie angles 52 each having a first planar portion 106 and a second planar portion 108 interconnected by a bend radius 110, the first planar portion 106 and the second planar portion 108 having a chamfered lower edge 114 with an acute angle C relative to the lower cap 46.

In yet another aspect of the disclosure, an under-floor system for an aircraft 10 comprises the structural arrangement of composite structural members 14 disclosed herein for mitigating damage when the under-floor system is subjected to a vertically applied compressive load.

Many other modifications and variations may of course be devised given the above description for implementing the principles in the present disclosure. For example, and without limitation, the size and cross-sectional shape of the composite structural members 14, stiffeners 50 and shear tie angles 52 may be modified to accommodate different aircraft or other structures and different types of load requirements. One or more of the stiffeners 50 may also be positioned on the vertical web 48 at an angle other than vertical, for example about 10 degrees from vertical to react compressive loads that are applied off-axis. It is intended that all such modifications and variations be considered as within the spirit and scope of this disclosure, as defined in the following claims.

The invention claimed is:

1. A composite structural member for an aircraft frame comprising:
    an upper cap and a lower cap each having a horizontal portion and a vertical portion extending in a generally perpendicular direction away from the horizontal portion, the vertical portion of the upper cap and the vertical portion of the lower cap interconnected by a vertical web, the vertical web having a web thickness that is less than a cap thickness of the vertical portion of the upper cap and the lower cap;
- a stiffener positioned on at least one side of the vertical web, a top end of the stiffener positioned proximate the horizontal portion of the upper cap, and a bottom end of the stiffener spaced apart from the horizontal portion of the lower cap by a trigger distance and having a chamfered edge that forms an acute angle between the chamfered edge and a top surface of the lower cap; and
- a crush fitting having a shoulder positioned between the top end of the stiffener and a bottom surface of the upper cap.

2. The composite structural member of claim 1, wherein a pair of stiffeners is arranged in a back-to-back relationship with the vertical web between the intermediate portion of each of the pair of stiffeners.

3. The composite structural member of claim 1, wherein the stiffener has a flat intermediate portion positioned against the at least one side of the vertical web and two side portions extending in a generally perpendicular direction away from vertical sides of the intermediate portion and the vertical web, a bottom surface of the two side portions of the stiffener being angled to form the acute angle between the chamfered edge and the top surface of the lower cap.

4. The composite structural member of claim 1, wherein the acute angle is about 30° to about 60° and the trigger distance between the bottom end of the stiffener and the horizontal portion of the lower cap is about 0.01 to about 0.03 inch.

5. The composite structural member of claim 1, wherein a rear, top portion of the crush fitting comprises a fillet radius nested into a radius corner between the horizontal portion and the vertical portion of the upper cap.

6. A structural arrangement for energy absorption comprising:
- a first pair of substantially parallel composite structural members and a second pair of substantially parallel composite structural members arranged orthogonal to and intersecting the first pair of substantially parallel composite structural members, each of the composite structural members having an upper cap and a lower cap, each having a horizontal portion and a vertical portion extending in a generally perpendicular direction away from the horizontal portion, the vertical portion of the upper cap and the vertical portion of the lower cap interconnected by a vertical web, the vertical web having a web thickness that is less than a cap thickness of the vertical portion of the upper cap and the lower cap;
- a stiffener positioned on at least one side of the vertical web in each of the substantially parallel composite structural members of the first pair, a top end of the stiffener positioned proximate the horizontal portion of the upper cap, and a bottom end of the stiffener spaced apart from the horizontal portion of the lower cap by a trigger distance and having a chamfered edge that forms an acute angle between the chamfered edge and a top surface of the lower cap; and
- a crush fitting having a shoulder positioned between the top end of the stiffener and a bottom surface of the upper cap of the structural members.

7. The structural arrangement of claim 6, wherein a pair of stiffeners is arranged in a back-to-back relationship with the vertical web between an intermediate portion of each of the pair of stiffeners.

8. The structural arrangement of claim 6, wherein the stiffener has a flat intermediate portion positioned against the at least one side of the vertical web and two side portions extending in a generally perpendicular direction away from a vertical side of the intermediate portion and the vertical web, a bottom surface of the two side portions of the stiffener being angled to form the acute angle between the chamfered edge and the top surface of the lower cap.

9. The structural arrangement of claim 6, wherein the acute angle is about 30° to about 60° and the trigger distance between the bottom end of the stiffener and the horizontal portion of the lower cap is about 0.01 to about 0.03 inch.

10. The structural arrangement of wherein a rear, top portion of the crush fitting comprises a fillet radius nested into a radius corner between the horizontal portion and the vertical portion of the upper cap.

11. The structural arrangement of claim 6, wherein the composite structural members of the first pair are connected to the composite structural members of the second pair with a plurality of shear tie angles, each of the shear tie angles having a first planar portion and a second planar portion interconnected by a bend radius, the first planar portion connected to one of the composite structural members of the first pair and a second planar portion connected to one of the composite structural members of the second pair, the first planar portion and the second planar portion having a chamfered bottom edge with a second acute angle relative to the horizontal portion of the lower cap, the chamfered bottom edge being spaced apart from the horizontal portion of the lower cap by the trigger distance.

12. The structural arrangement of claim 11, wherein the second acute angle is about 30° to about 60°.

13. An under-floor system for an aircraft comprising the structural arrangement of claim 6 for mitigating damage when the under-floor system is subjected to a vertically applied compressive load.

14. A method for absorbing energy in a composite structural arrangement when the composite structural arrangement is subjected to a vertically applied compressive load, the method comprising:
- forming composite structural members having an upper cap and a lower cap each having a horizontal portion and vertical portion extending in a generally perpendicular direction away from the horizontal portion, the vertical portion of the upper cap and the vertical portion of the lower cap interconnected by a vertical web having a web thickness that is less than a cap thickness of the vertical portion of the upper cap and the lower cap;
- positioning a stiffener on at least one side of the vertical web in a first pair of the composite structural members, such that a top end of the stiffener is positioned proximate the horizontal portion of the upper cap, and a bottom end of the stiffener is spaced apart from the horizontal portion of the lower cap by a trigger distance and has a chamfered edge at a bottom end thereof that forms an acute angle between the chamfered edge and a top surface of the lower cap;
- arranging the first pair of the composite structural members substantially parallel to each other and orthogonal to a second pair of substantially parallel composite structural members; and positioning a crush fitting having a shoulder such that the shoulder is positioned between the top end of the stiffener and a bottom surface of the upper cap.

15. The method of claim 14, further comprising nesting a fillet radius at a rear, top portion of the crush fitting into a radius corner between the horizontal portion and the vertical portion of the upper cap.

16. The method of claim 14, further comprising arranging a pair of stiffeners in a back-to-back relationship with the vertical web between an intermediate portion of each of the pair of stiffeners.

17. The method of claim 14, further comprising connecting the composite structural members of the first pair to the composite structural members of the second pair with a plurality of shear tie angles each having a first planar portion and a second planar portion interconnected by a bend radius, the first planar portion connected to an end of one of the composite structural members of the first pair and a second planar portion connected to an end of one of the composite structural members of the second pair, the first planar portion and the second planar portion having a chamfered bottom edge with a second acute angle relative to the horizontal portion of the lower cap, the chamfered bottom edge being spaced apart from the horizontal portion of the lower cap by the trigger distance.

* * * * *